United States Patent
Pallot

(10) Patent No.: US 6,604,036 B2
(45) Date of Patent: Aug. 5, 2003

(54) METHOD FOR CONTROLLING THE STABILITY OF A VEHICLE BASED ON LATERAL FORCES EXERTED ON EACH WHEEL

(75) Inventor: Patrick Pallot, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 09/837,522

(22) Filed: Apr. 18, 2001

(65) Prior Publication Data

US 2002/0035871 A1 Mar. 28, 2002

(30) Foreign Application Priority Data

Apr. 18, 2000 (FR) ............................................ 00 05070
Aug. 10, 2000 (FR) ............................................ 00 10542

(51) Int. Cl.⁷ .............................................. G06F 17/00
(52) U.S. Cl. .............................. 701/48; 701/72; 701/94
(58) Field of Search .............................. 701/48, 72, 73, 701/78, 94

(56) References Cited

U.S. PATENT DOCUMENTS

| | | | | |
|---|---|---|---|---|
| 4,998,593 A | * | 3/1991 | Karnopp et al. ............. 180/244 |
| 5,229,944 A | | 7/1993 | Yasuno ................... 364/426.01 |
| 5,502,433 A | | 3/1996 | Breuer et al. ................ 340/438 |
| 5,548,536 A | | 8/1996 | Ammon ....................... 364/565 |
| 5,852,787 A | | 12/1998 | Fodor et al. .................... 701/6 |
| 5,864,056 A | | 1/1999 | Bell et al. ...................... 73/146 |
| 5,884,724 A | | 3/1999 | Bohner et al. ............... 180/402 |
| 5,915,800 A | * | 6/1999 | Hiwatashi et al. .......... 303/146 |
| 5,925,083 A | * | 7/1999 | Ackermann .................. 180/421 |
| 5,952,730 A | | 9/1999 | Haller et al. ................ 307/10.1 |
| 6,021,367 A | | 2/2000 | Pilutti et al. .................... 701/41 |
| 6,056,371 A | * | 5/2000 | Lin et al. ..................... 303/146 |

FOREIGN PATENT DOCUMENTS

| | | |
|---|---|---|
| DE | 3937966 | 5/1991 |
| DE | 4216301 | 11/1993 |
| DE | 19601795 | 7/1997 |
| DE | 19623595 | 12/1997 |
| DE | 19735787 | 3/1998 |
| EP | 0943515 | 9/1999 |
| GB | 2263180 | 7/1993 |

OTHER PUBLICATIONS

Patent Abstract of Japanese Publication No. 60–205037, published Oct. 16, 1985.

* cited by examiner

*Primary Examiner*—Tan Q. Nguyen

(57) ABSTRACT

A method for regulating a system for controlling the stability of a vehicle based on the forces exerted at the center of each wheel of the vehicle. Since, the actions of the driver, whether steering, accelerating or braking, are reflected by forces (variations in forces) transmitted by the tires to the ground, it is proposed to control the operating means of the vehicle (active anti-roll system, engine torque, braking torque or active steering) by force expectations derived from the actions of the driver. Depending on the speed of travel of the vehicle and the angle to the steering wheel (steering wheel velocity and steering wheel acceleration), the method expresses the inputs of the driver in terms of forces. If the actual forces that are measured do not correspond to the forces desired by the driver, the active system compensates for this difference by acting on the distributions of forces in the vehicle chassis.

13 Claims, 11 Drawing Sheets

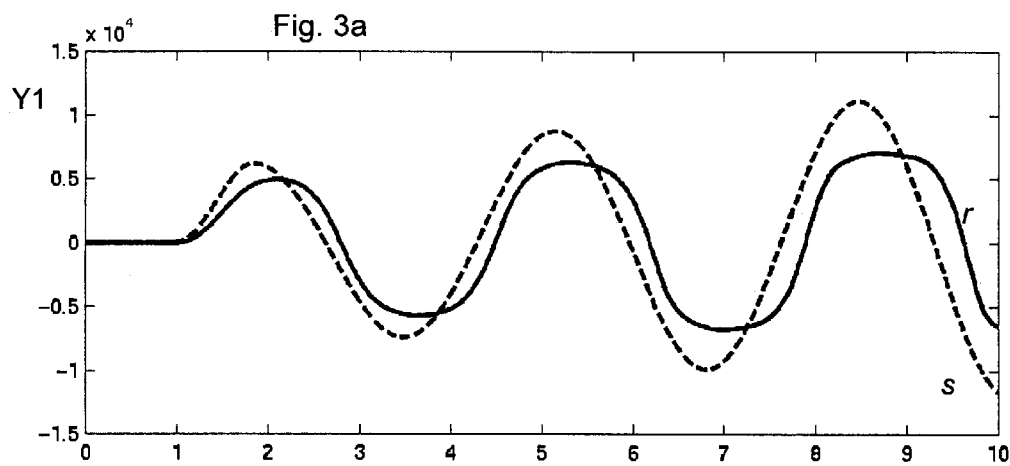
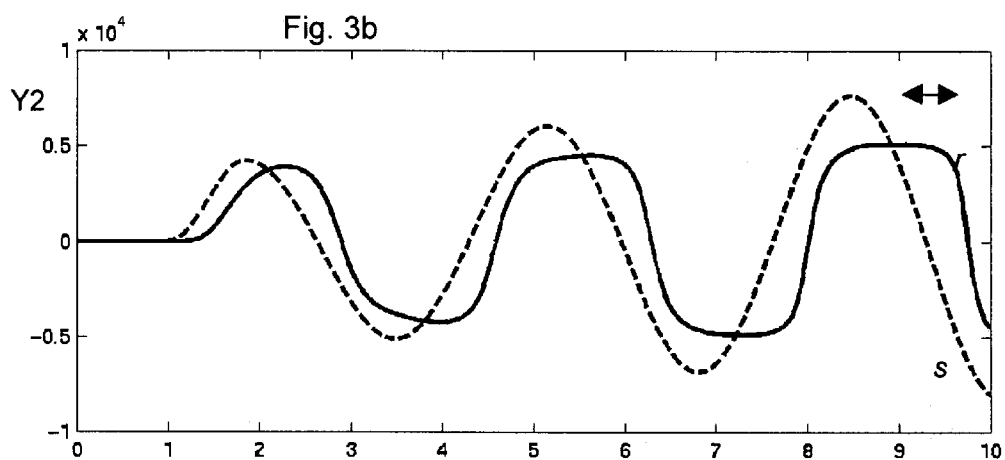
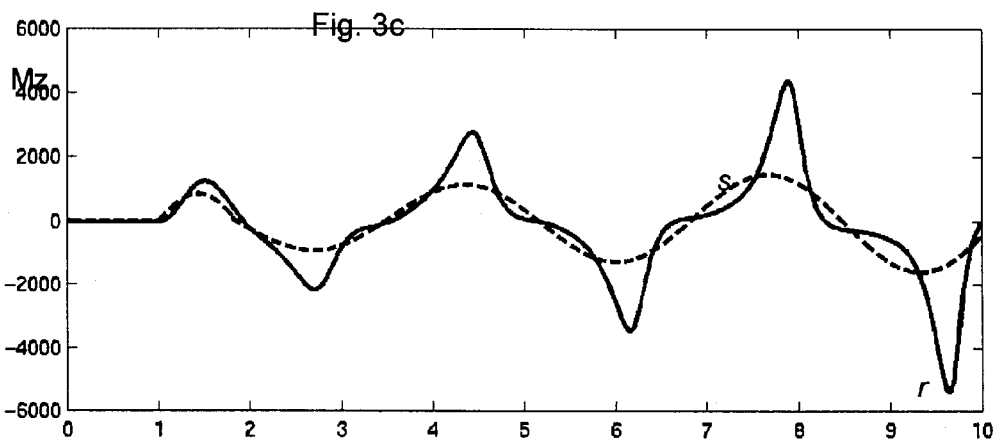

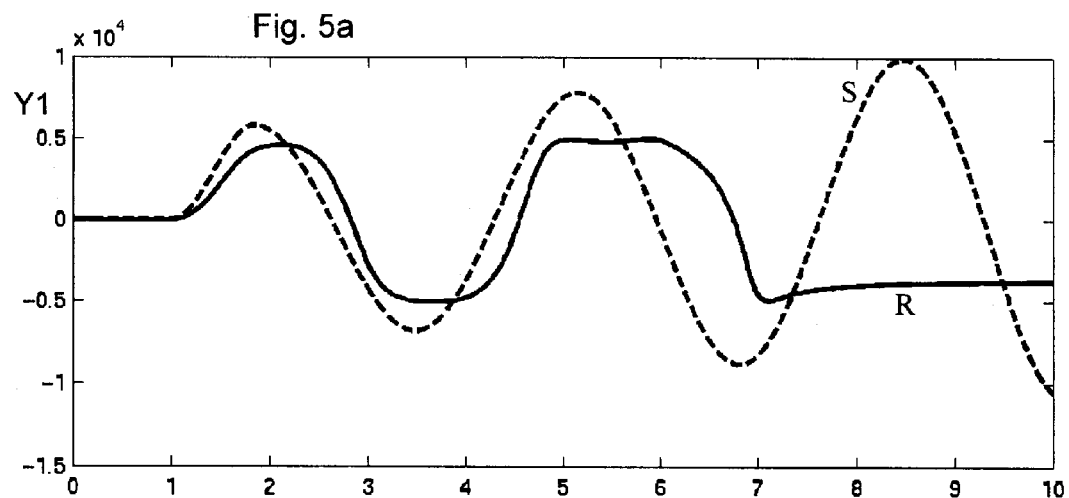
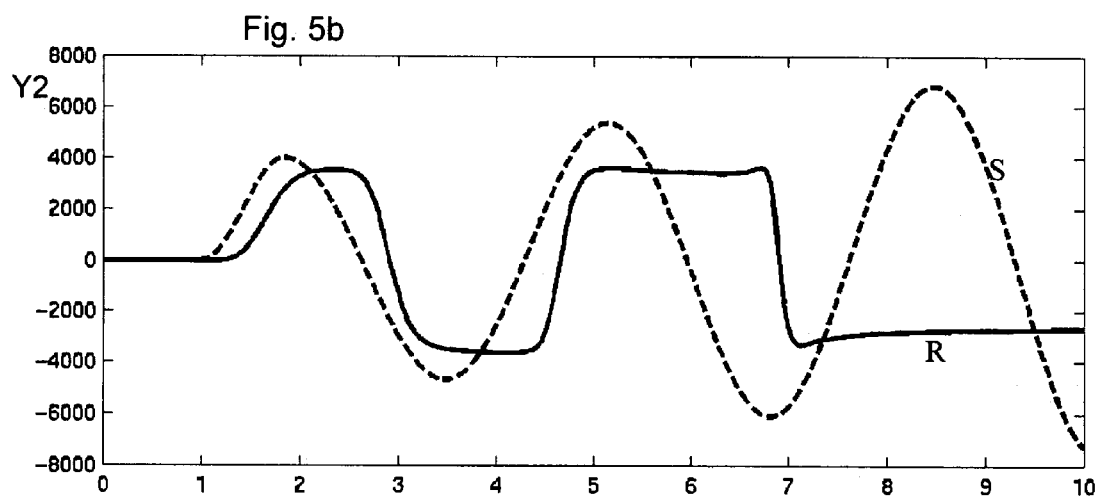
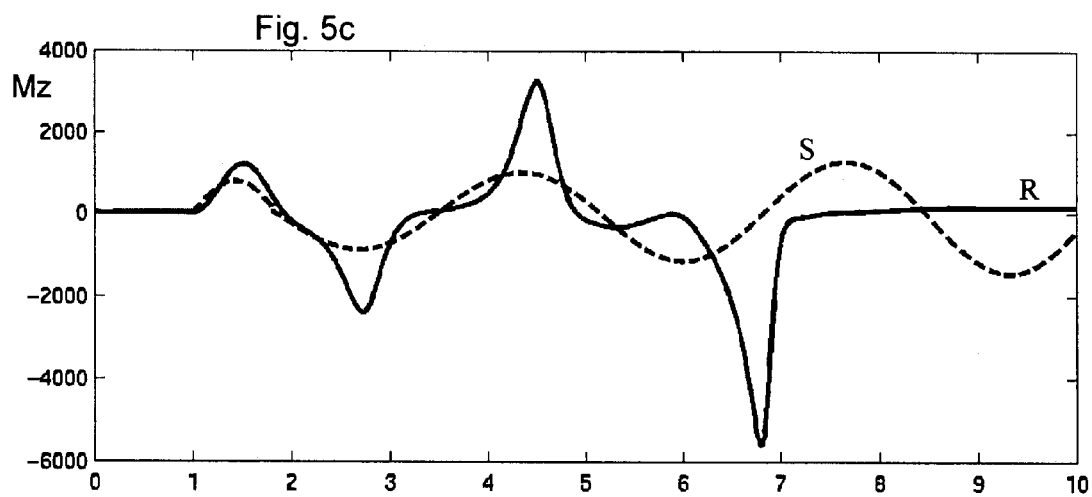

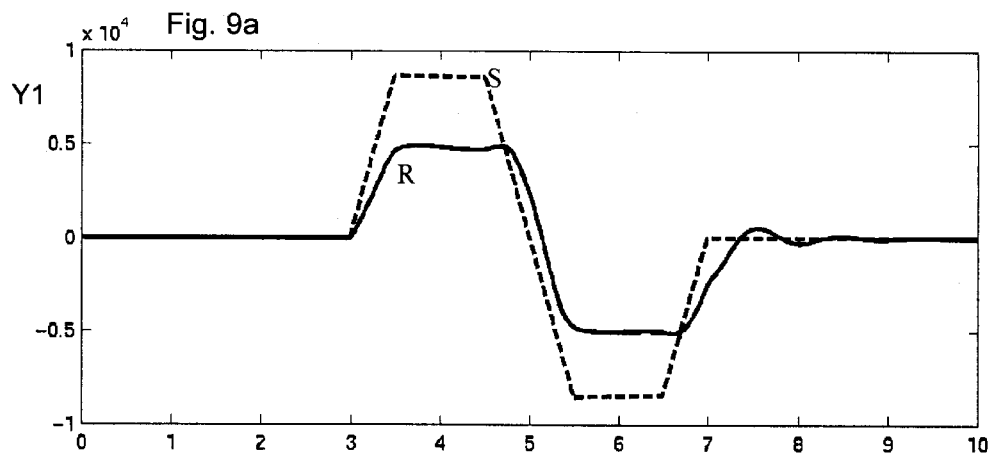
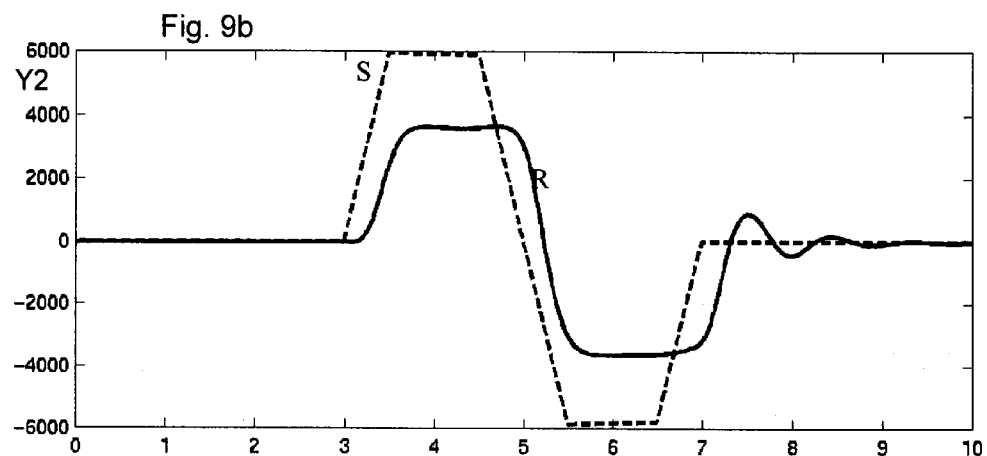
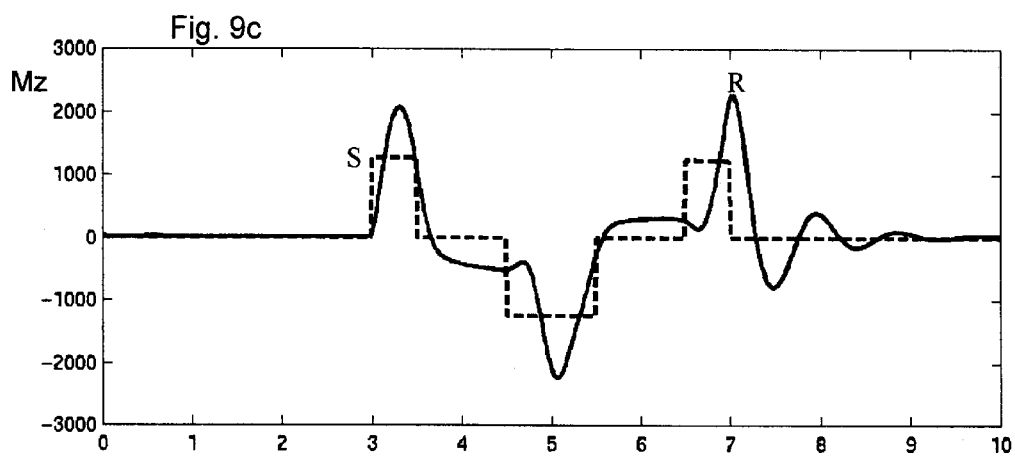

METHOD FOR CONTROLLING THE STABILITY OF A VEHICLE BASED ON LATERAL FORCES EXERTED ON EACH WHEEL

BACKGROUND OF THE INVENTION

The present invention relates to systems for controlling the stability of a vehicle, commonly known as ESP (Electronic Stability Program) systems.

In safety systems for vehicles, it is necessary to be able to assess the handling of the vehicle in real time. This is the basis of the so-called ESP systems for controlling stability. These systems currently rely on, inter alia, monitoring movements of the vehicle by installing sensors in order to measure the lateral acceleration of the vehicle and the yaw velocity of the vehicle.

When moving under good safety conditions, that is to say when the stability of the vehicle is not compromised, the vehicle obeys the driver's commands. If the driver, essentially as a result of his actions of steering the wheel, drives the vehicle beyond the limits of safety, the vehicle will exhibit oversteering or understeering. The vehicle turns, that is to say performs a yaw movement, in excess of that desired by the driver (oversteering) or less than desired by the driver (understeering).

Using a mathematical model of the tire and a mathematical model of the vehicle, and based on measurements supplied by sensors recording the actions of the driver of the vehicle (steering wheel angle, brake pedal depress, accelerator pedal depress) by speed sensors for the wheels, and on measurements of the lateral acceleration and yaw velocity, an ESP system constantly calculates the forces at the center of the wheels and estimates the grip potential of the road surface as a function of the lateral acceleration. Furthermore, the ESP system evaluates the handling of the vehicle, compares it to the handling desired by the driver, and corrects this handling if it establishes that the vehicle is not moving along a stable trajectory.

However, the use of tire models can introduce a certain number of approximations into the overall model. Furthermore, the fact that a control system is based on the displacements of the vehicle necessarily leads to a response a posteriori, which can be effective only after a delay depending on the inertia of the vehicle. It can be seen from this that an ESP system, since its variables include, inter alia, measurements of the lateral acceleration and the yaw velocity of the vehicle, first of all has to measure the displacement of the vehicle before deciding whether the displacement is within the bounds of stability or not, and can only then act on the operating means of the vehicle.

The system will detect a displacement of the vehicle not in accordance with the command given by the driver, the more slowly the greater the inertia of the vehicle, and the necessary correction will be all the more difficult the greater the inertia. At the present time the operating means are basically the vehicle's brakes, controlled in this case wheel by wheel and outside the voluntary action of the driver, and the engine force, which can be reduced automatically by regulating the engine.

Furthermore, the detection of yaw movements requires the use of costly sensors. Also, existing systems have to estimate the grip of the wheels on the road surface in order to select the actuating parameters. This estimation deviates to a greater or lesser degree to the actual conditions.

SUMMARY OF THE INVENTION

The object of the present invention is to obviate the aforementioned disadvantages and, more particularly, to exclude completely the inertia of a vehicle in order to be able to act on the appropriate operating means so as to maintain the vehicle in a stable trajectory in accordance with the driver's commands, by regulating the operating means in such a way that the actual forces acting at the center of each wheel correspond to the desired forces.

The invention provides a method for controlling the stability of a vehicle that has the advantage that it can be carried out without having to measure the yaw angle of the vehicle. The invention relates to a vehicle comprising a body and at least one front axle and one rear axle. A preferred but not limiting field of application of the invention is the case where each axle involves at least two suspension devices, each comprising one wheel, the said suspension devices being mounted on both sides of the mid-plane of symmetry of the vehicle, for example in the case of 4-wheeled touring vehicles. Each suspension device comprises a wheel, generally equipped with a tire or, which is the same in the context of the present invention, a non-pneumatic outer casing in contact with the ground. The vehicle is provided with operating means to act on the forces transmitted to the ground by each of the wheels, such as brakes, means for steering the wheels, optionally operating in a selective manner wheel by wheel, and distribution of the loads carried by each of the wheels.

According to a first embodiment of the invention, the method comprises the following steps:

measuring in real time the lateral forces "Y" acting at the center of each of the front and rear wheels;

calculating for each of the wheels the desired lateral forces "$Y_{desired}$" on the basis of commands from the driver of the vehicle;

comparing the desired lateral forces with the measured lateral forces in order to obtain an error signal with respect to the desired lateral forces, and if the forces acting on one of the axles do not correspond to the desired lateral forces, acting on the operating means so as to minimize the error signal.

The commands of the driver of the vehicle are intended to maintain the vehicle on a straight line trajectory regardless of the ambient disturbances (for example sidewind gusts), or are intended to cause the vehicle to execute a lateral displacement (change of lane for overtaking on a motorway) or to turn. Regardless of the operating means of the vehicle actuated by the driver (conventional steering wheel, operating lever as illustrated for example in patent application EP 0 832 807), the driver's aim in fact is to impose certain lateral forces or certain variations of lateral forces. The invention accordingly involves measuring in real time the effective forces, comparing them with commands by the driver translated into lateral forces or variations in lateral forces, and as a result controlling appropriate operating means available on the vehicle.

According to a second embodiment of the invention, involving processing the driver's commands differently (the reasons for which will be discussed in more detail hereinafter), the method comprises the following steps:

measuring in real time the lateral forces "Y" acting at the center of each of the front and rear wheels, and calculating in real time the effective yaw moment exerted by the wheels on the vehicle;

measuring in real time a signal at the device for controlling the steering and calculating the desired yaw moment "$M_{desired}$";

comparing the effective and desired yaw moments in order to obtain an error signal with respect to the desired yaw moment; and if the effective yaw moment is greater than the desired yaw moment, acting on the operating means so as to minimize the error signal.

Accordingly, if the lateral force of the front axle saturates, the vehicle will understeer since the lateral force (forces) of the front axle are less than the forces desired by the driver. An automatic action, for example of the type already known per se in conventional ESP systems (other types of actions will be discussed hereinafter) enables a resultant force to be exerted on the vehicle chassis in accordance with the driver's wishes and thus enables understeering to be avoided.

If on the other hand it is the lateral force of the rear axle that saturates, then the vehicle will oversteer since the lateral forces of the rear axle are less than the forces desired by the driver. The said automatic action enables a resultant force to be exerted on the vehicle chassis in accordance with the driver's wishes and thus enables oversteering to be avoided.

The above description relates to what is conventionally called a steady state (or established state). When considering a typical transient state involved in an emergency maneuver (avoiding an obstacle, changing lane), the steering wheel velocity may be regarded as equivalent to a desired yaw moment acting on the vehicle. If the actual yaw moment is less than the desired yaw moment, the vehicle will not turn sufficiently. If on the other hand the actual yaw moment is greater than the desired yaw moment, the vehicle will turn too much.

According to yet another embodiment of the invention, involving processing the driver's commands differently so as to try to simulate the subjective perception of a driver, the method comprises the following steps:

measuring in real time the lateral forces "Y" acting at the center of each of the front and rear wheels, measuring in real time the angle at the steering wheel, calculating in real time the yaw acceleration from the lateral forces "Y" and the distances of the center of gravity of the vehicle from the front and rear wheels, calculating in real time the gain in the yaw velocity with respect to the steering wheel velocity, if the gain in the yaw velocity is less than a first low threshold, controlling the operating means in order to increase the steering of the vehicle, and if the gain in the yaw velocity is greater than a first high threshold, controlling the operating means in order to reduce the steering of the vehicle.

The expression "the gain in the yaw velocity" is understood to mean the ratio of the variation of the yaw velocity to the variation of the angle at the steering wheel. It should be noted that the speed according to which the driver acts on the steering wheel corresponds to a need for a yaw acceleration of the vehicle. If the gain in the yaw velocity is less than a first low threshold, it is considered that the vehicle will begin to understeer dangerously. The object of the correction is to assist the steering. If the gain in the yaw velocity is greater than a first high threshold, it is considered that the vehicle will begin to oversteer dangerously. The object of the correction is to prevent excessive steering. These thresholds may be determined experimentally. In order to quantify these concepts, a value of the order of 0.1 may be adopted for the first low threshold, and a value of the order of 0.5 for the first high threshold.

The method according to the invention permits, if the forces of one of the axles do not correspond to the desired lateral forces, or if the effective yaw moment is greater than the desired yaw moment, or if the gain in the yaw velocity does not correspond to what is regarded as normal, the transmission of an action signal to the operating means in order to minimize the error signal without the need, either to establish such a signal or to measure the yaw velocity of the vehicle. It is understood of course that such a method is compatible with measuring the yaw velocity, particularly if it is desired to add redundancy terms to the calculations.

As can be seen, the invention provides a method for regulating a system for controlling the stability of a vehicle based on the forces acting at the center of each wheel of the vehicle. In fact, the actions of the driver, whether they involve steering, accelerating or braking, will become forces (variations in forces) transmitted by the tires to the ground. Depending on whether or not these variations of forces are compatible compared to the commands of the driver, it may be concluded whether or not the vehicle is stable. The resultant displacements are calculated on the basis of the forces acting on the ground. In this way it is possible to correct the trajectory of the vehicle much earlier and an ESP system gains in fineness of correction. Safety is better and the comfort of the driver and passengers is improved.

The estimation of stability criteria in real time, based on forces on the ground, enables the control of the stability of the trajectory of a vehicle to be improved, and the direct measurement of the force enables, for example, the saturation point of the pneumatic tire to be monitored accurately regardless of the grip on the road surface, by detecting the occurrence of non-linearity between the developed lateral force and the angle of sideslip of the tire in question.

The cause of loss of stability of the vehicle is mainly the fact that the tires are no longer able to correct the trajectory, given the movement of the vehicle. Irrespective of the lateral force developed by the tires, this lateral force will never be able to counteract the forces of inertia. This may be due to a poor grip (wet road, (black) ice, snow, sand, dead leaves), to the fact that the tire is used by the driver under improper conditions (flat tire or underinflated tire), or to the fact that the vehicle is directly placed in a situation of excessive drift or sideslip that exceeds the physical limits of one or more of the tires. In this case it may be said that one or more of the tires reaches its saturation point.

The suspension bearings may be equipped with instruments, as proposed in patent application JP60/205037, which enables the longitudinal and lateral forces developed by the tire to be determined easily by measurements made on the suspension bearings. Alternatively, the tire itself is equipped with sensors for recording the forces of the tire on the ground. Measures may be adopted as explained for example in patent DE 39 37 966 or as discussed in U.S. Pat. No. 5,864,056 or in U.S. Pat. No. 5,502,433.

On the basis of the forces measured by one or other of the above methods, and from equilibrium equations of a suspension device, the forces acting at the center of each wheel may accordingly easily be calculated. Thus, in real time 3 forces X, Y and Z are available, which in particular enables the Y signal to be processed for the reasons explained in the present document.

DESCRIPTION OF THE DRAWINGS

The invention will be described in more detail hereinafter with the aid of the following figures, in which:

FIGS. 3a, 3b and 3c illustrate the lateral forces and yaw moments resulting from an increasing zigzag steering maneuver, on a dry surface, at 90 km/hour.

DESCRIPTION OF PREFERRED EMBODIMENTS

Figure 1:
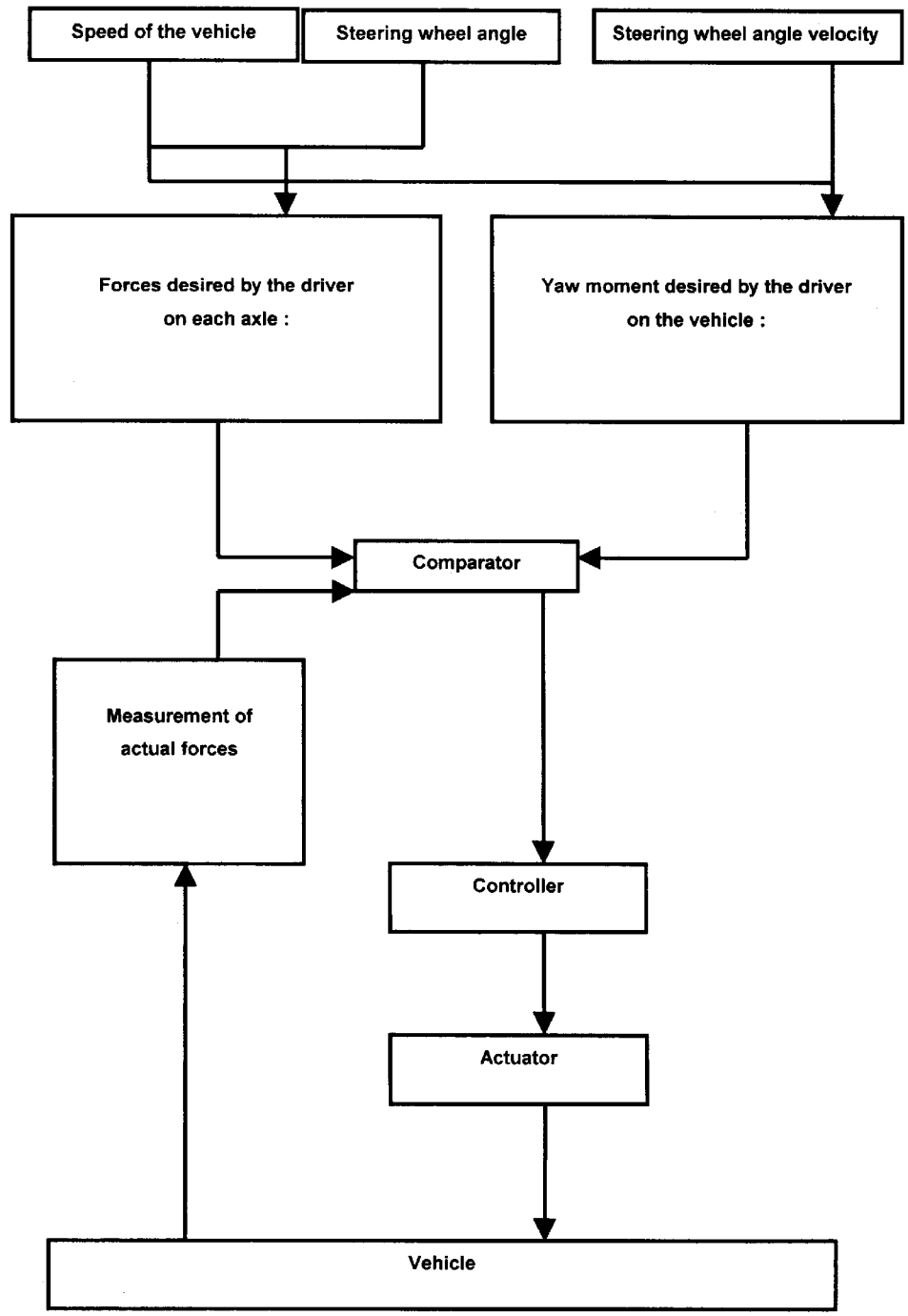
FIG. 1 is a block diagram illustrating the invention.

We shall start from the fact that, at a given speed, an angle at the steering wheel imposed by the driver may be interpreted as a lateral force expectation or as a yaw moment expectation on the vehicle. This is shown diagrammatically in the top part of FIG. 1. Furthermore, it has been seen that in order to implement the present invention, it is necessary to have measurements of the real lateral forces (lateral forces of the pneumatic tires or elastic tire casings used in the suspension device). This is illustrated in the left-hand section, starting from "vehicle" in FIG. 1. The diagram in FIG. 1 superimposes two methods: either the actions of the driver are interpreted as lateral forces demands (i.e. expectations), which are compared with the measured lateral forces, or the actions of the driver are interpreted as a yaw moment demand (i.e. expectations), and the lateral force measurements are converted into a measured yaw moment in order to make the required comparison.

It will be assumed that the lateral forces of the front axle are less than the forces required by the driver. An automatic action enables a resultant of force on the vehicle chassis to be obtained in accordance with the wishes of the driver and thus enables understeering to be avoided.

As an alternative or in addition to a braking action, an action on an additional steering means, exerted for example by means of an irreversible stepping motor mounted in the steering column, also enables the resultant of forces on the vehicle chassis to be approximated in accordance with the wishes of the driver. Another possible way of effecting the action on a steering means consists for example in sending the appropriate control commands to the controller described in U.S. Pat. No. 5,884,724.

As an alternative or as a further addition to braking actions or actions on the steering mentioned above, an action on the roll moment distribution between the front axle and rear axle also enables action to be exerted on the lateral forces developed respectively by the front and rear axles.

In fact, when a vehicle departs from the trajectory desired by the driver, one or other or several of the tires become incapable of developing the excess lateral force that they would have had to develop in order to compensate for the forces of inertia. It may be said that the tire or tires have reached their saturation limit. In fact, this saturation phenomenon, when it starts, involves for most of the time a single tire of a single axle. As a result one of the axles becomes incapable of developing the expected lateral force and the vehicle will oversteer or understeer depending on whether the saturation involved the rear axle or the front axle.

Furthermore, it is known that when turning, the centrifugal force overloads the outer tires. The distribution of this overload between the front axle and rear axle depends on the anti-roll characteristics of the vehicle suspension.

By reducing the amount of anti-roll force developed by the axle containing the tire whose lateral force reaches saturation point first, not only can the other tire on the same axle develop a greater lateral force due to a larger vertical load, but also the saturation point of a tire on the other axle will be approached or even reached, thereby setting a limit on or reducing the lateral forces developed by the other axle.

If on the other hand it is the lateral force of the rear axle that reaches saturation point first, the vehicle will turn because the lateral forces of the rear axle are less than the forces desired by the driver. An automatic braking action or action on a supplementary steering means or on the roll moment distribution enables a resultant of forces to be obtained on the vehicle chassis in accordance with the wishes of the driver and thus enables oversteering to be avoided.

The rules for controlling the operating means described above are shown diagrammatically in the block "Controller" in FIG. 1, which controls the one or more operating means discussed above.

The above paragraphs refer to what is commonly known as a steady state (or established state). Considering a typical transient state of an emergency maneuver (avoiding an obstacle, changing lane), the steering wheel velocity is instead regarded as equivalent to a desired yaw moment on the vehicle. If the actual yaw moment is less than the desired yaw moment, the vehicle does not turn sufficiently. If the actual yaw moment is greater than the desired yaw moment, the vehicle turns too far. The controller then acts in an appropriate manner on one or other or several of the possible operating means including the brakes, or on a supplementary steering means or on the distribution of the roll moment distribution, thereby enabling a yaw moment to be exerted on the vehicle chassis in accordance with the wishes of the driver.

The following conventional expressions will be adopted:
Desired front axle lateral force: $Y_{1desired}$
Desired rear axle lateral force: $Y_{2desired}$
Desired yaw moment: $M_{zdesired}$
$\psi$ yaw angle of the vehicle,
$\delta$ angle of sideslip of the vehicle,
$\alpha_c$ steering angle of a wheel.
$\gamma_t$ lateral acceleration.

Figure 2:
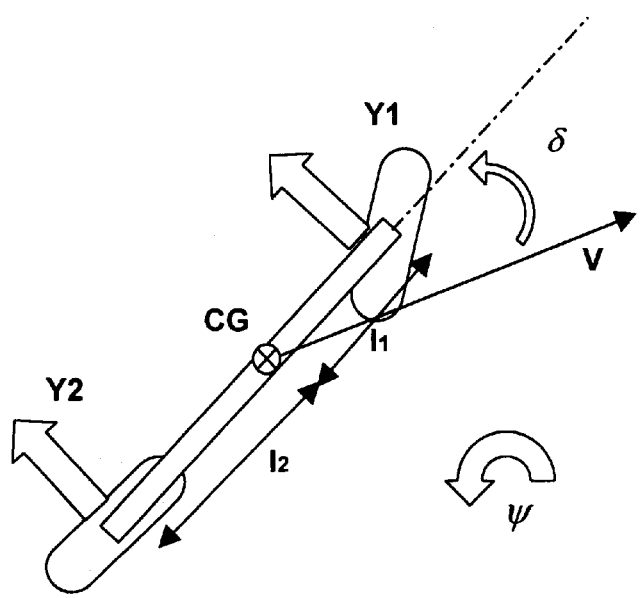
FIG. 2 shows the arrangement of a two-wheel vehicle.

In order to simplify the discussion of the physical phenomena in question, a two-wheeled vehicle is considered hereinafter (see FIG. 2). The lateral forces acting on the wheels of each axle under consideration are represented at the center of each axle. The person skilled in the art is familiar with this conventional approach and knows, as and when necessary, how to apply this to vehicles with axles having more than one wheel.

The equations of the two-wheeled vehicle are as follows:

$$M\gamma_t = MV(\dot{\delta}+\dot{\psi}) = Y_1 + Y_2 \tag{1}$$

where M is the mass of the vehicle, V is the longitudinal speed of the vehicle, $Y_1$ is the lateral force on the front axle, and $Y_2$ is the lateral force on the rear axle, equation (1)

expressing the fact that the lateral forces balance out the lateral acceleration, $$I_z \dot{\psi} = l_1 Y_1 - l_2 Y_2 \quad (2)$$

where $I_z$ is the yaw inertia, $l_1$ is the distance of from the front axle to the center of gravity, $l_2$ is the distance of the rear axle to the center of gravity, equation (2) expressing the fact that the moments are in equilibrium.

The rigid body movement of the two-wheeled vehicle and the steering of the wheels of the front axle enables the angles of sideslip of the front and rear tires to be expressed as follows:

a) Sideslip of the front axle:

$$\delta_1 = \delta + l_1 \frac{\dot{\psi}}{V} - \alpha_C \quad (3)$$

b) Sideslip of the rear axle:

$$\delta_1 = \delta - l_2 \frac{\dot{\psi}}{V} \quad (4)$$

The quantity $l_1$ (respectively $l_2$) is the distance is the distance from the front axle (respectively rear axle) to the center of gravity CG of the vehicle. The geometry of the vehicle is shown in FIG. 2.

These angles of sideslip of the tires give rise to lateral forces on the two-wheeled vehicle:

$$Y_1 = -D_1 \delta_1 \quad (5)$$

$$Y_2 = -D_2 \delta_2 \quad (6)$$

The quantity D1 (respectively D2) is the overall cornering stiffness of the tire at front axle (respectively rear axle)

By substituting the equations 3 and 4 in 5 and 6, one obtains $$Y_1 = -D_1 \left( \delta + l_1 \frac{\dot{\psi}}{V} - \alpha_C \right) \quad (7)$$

$$Y_2 = -D_2 \left( \delta - l_2 \frac{\dot{\psi}}{V} \right) \quad (8)$$

By substituting the equations (7) and (8) in the equations (1) and (2), a system is obtained that is expressed only in terms of the yaw velocity (and its derivative), the angle of sideslip (and its derivative), and the characteristics of the vehicle:

$$MV(\dot{\delta} + \dot{\psi}) = D_1 \left( \delta + \frac{l_1 \dot{\psi}}{V} - \alpha_c \right) + D_2 \left( \delta - \frac{l_2 \dot{\psi}}{V} \right) \quad (1a)$$

$$I_z \ddot{\psi} = l_1 \left( D_1 \left( \delta + \frac{l_1 \dot{\psi}}{V} - \alpha_c \right) \right) - l_2 \left( D_2 \left( \delta - \frac{l_2 \dot{\psi}}{V} \right) \right) \quad (2a)$$

By a Laplace transformed function, it is possible to express the transfer functions between the yaw velocity and the angle at the steering wheel, and between the body sideslip and the angle at the steering wheel. The static part (that is to say the part relating to a zero frequency) of this transfer function is then simply expressed as a function of the characteristics of the vehicle (coefficient of proportionality) and of the speed of forward movement:

$$\dot{\psi} = \frac{1}{l_1 + l_2} \frac{V}{1 + \frac{V^2}{\frac{D_1 D_2 (l_1 + l_2)^2}{M(D_2 l_2 - D_1 l_1)}}} \alpha_c \quad (9)$$

$$\delta = \frac{1}{l_1 + l_2} \frac{l_2 - \frac{l_1 M V^2}{D_2 (l_1 + l_2)}}{1 + \frac{V^2}{\frac{D_1 D_2 (l_1 + l_2)^2}{M(D_2 l_2 - D_1 l_1)}}} \alpha_c \quad (10)$$

These expressions may be simplified by introducing a quantity Vc, called critical speed, consistent with a speed, and depending on the characteristics of the vehicle (weight supported by the front axle M1, weight supported by the rear axle M2, distances $l_1$ and $l_2$) and its specific tires:

$$V_c^2 = \frac{D_1 D_2 (l_1 + l_2)^2}{M(D_2 l_2 - D_1 l_1)} \quad (11)$$

$$= \frac{D_1 D_2 (l_1 + l_2)}{D_2 M_1 - D_1 M_2}$$

$$= \frac{l_1 + l_2}{\frac{M_1}{D_1} - \frac{M_2}{D_2}}$$

The expressions (9) and (10) become:

$$\dot{\psi} = \frac{1}{l_1 + l_2} \frac{V}{1 + \frac{V^2}{V_c^2}} \alpha_c$$

$$\delta = \frac{1}{l_1 + l_2} \frac{l_2 - \frac{l_1 M V^2}{D_1 (l_1 + l_2)}}{1 + \frac{V^2}{V_c^2}} \alpha_c$$

These expressions may be reintroduced into the equations (3) and (4) and then into the equations (5) and (6) in order to obtain the forces desired by the driver:

$$Y_1 \text{desired} = \frac{M_1}{l_1 + l_2} \frac{V^2}{1 + \frac{V^2}{Vc^2}} \alpha_c \quad (12)$$

$$Y_2 \text{desired} = \frac{M_2}{l_1 + l_2} \frac{V^2}{1 + \frac{V^2}{Vc^2}} \alpha_c \quad (13)$$

It can be seen that these formulae express the fact that the lateral force demand resulting from the actions of the driver depends only on the command ($\alpha_c$) itself, on the speed of the vehicle (V) and on other parameters all of which are functions of the vehicle itself (that is to say describe the vehicle).

Finally, by differentiating equation (9) and multiplying the yaw acceleration by the yaw inertia, one obtains the desired yaw moment Mz:

$$\ddot{\psi} = \frac{1}{l_1 + l_2} \frac{V}{1 + \frac{V^2}{Vc^2}} \dot{\alpha}_c \quad (14)$$

$$M_{desired} = I_z \dot{\psi} = \frac{I_z}{l_1 + l_2} \frac{V}{1 + \frac{V^2}{Vc^2}} \dot{\alpha}_c$$

Similarly, formula (14) expresses the fact that the yaw moment demand resulting from the actions of the driver depends only on the command ($\alpha_c$) itself, on the speed of the vehicle (V) and on other parameters all of which are functions of the vehicle itself (that is to say describe the vehicle).

It is also possible to express the variations of command at the steering wheel as demands for variations in forces in the axles:

$$\dot{Y}_1 desired = \frac{M_1}{l_1 + l_2} \frac{V^2}{1 + \frac{V^2}{Vc^2}} \dot{\alpha}_c$$

$$\dot{Y}_2 desired = \frac{M_2}{l_1 + l_2} \frac{V^2}{1 + \frac{V^2}{Vc^2}} \dot{\alpha}_c$$

It is assumed that it is possible to measure at each instant the lateral forces Y for all the wheels, the variations of the said lateral forces Y, and the variations of angle at the steering wheel. It is suggested that a trajectory control system be actuated as soon as the difference between the desired forces and the actual measured forces becomes too large. The criterion of stability that is thus proposed expresses the fact that the vehicle remains stable as long as this difference is small (compromise between the wishes of the driver and the actual conditions).

It will now be explained how a stability criterion may be established for the vehicle by estimating the following gains:

gain in the yaw velocity:

$$\frac{\partial \dot{\psi}}{\partial \alpha_c},$$

gain in the sideslip velocity:

$$\frac{\partial \dot{\delta}}{\partial \alpha_c}$$

gain in the lateral acceleration:

$$\frac{\partial \gamma_t}{\partial \alpha_c}$$

The various gains are expressed in terms of variation of the steering of the wheels.

The equations of the two-wheeled vehicle are given in the equations (1) and (2) above. The angle of steering of a wheel may be introduced into the following derivatives with respect to time:

$$\dot{\delta} = \frac{\partial \delta}{\partial t} = \frac{\partial \delta}{\partial \alpha_c} \frac{\partial \alpha_c}{\partial t} \quad (15)$$

$$\ddot{\psi} = \frac{\partial \dot{\psi}}{\partial t} = \frac{\partial \dot{\psi}}{\partial \alpha_c} \frac{\partial \alpha_c}{\partial t} \quad (16)$$

It is assumed that the lateral forces Y for all the wheels, the variations in the said lateral forces Y, and the variations in the angle at the steering wheel can be measured at each point in time.

By substituting expression (16) in equation (2) one obtains the gain in the yaw velocity as a function of the forces:

$$I_z \frac{\partial \dot{\psi}}{\partial \alpha_c} \dot{\alpha}_c = l_1 Y_1 - l_2 Y_2,$$

from which one immediately obtains:

$$\frac{\partial \dot{\psi}}{\partial \alpha_c} = \frac{l_1 Y_1 - l_2 Y_2}{I_z \dot{\alpha}_c}, \quad (17)$$

i.e. the gain in the yaw velocity with respect to the variation of the steering of the wheels.

In order to make a connection with the "subjective" perception of the driver, it is proposed that the gains at the steering wheel ($\alpha_v$ being the angle of the steering wheel) be reformulated by introducing the reduction ratio of the steering command: $\alpha_v = \alpha_c \times n$. The gain in yaw velocity becomes:

$$\frac{\partial \dot{\psi}}{\partial \alpha_v} = \frac{1}{n} \frac{\partial \dot{\psi}}{\partial \alpha_c} = \frac{1}{n} \frac{l_1 Y_1 - l_2 Y_2}{I_z \dot{\alpha}_c} \quad (18)$$

It has been found experimentally that the normal driving range of a driver is located within the following range:

$$0.1 < \frac{\partial \dot{\psi}}{\partial \alpha_v} < 0.5$$

It is proposed that a trajectory control system be actuated as soon as the gain in the yaw velocity as a function of the angle at the steering wheel (see equation (18)) becomes too small (understeering) or too large (oversteering). The stability criterion thus proposed expresses the fact that the vehicle remains stable as long as the gain remains limited.

In another mode of implementation, it is possible to establish as criterion the gain in lateral acceleration as a function of the angle at the steering wheel.

From equation (1), by differentiating with respect to the wheel angle, one obtains:

$$MV \left( \frac{\partial \dot{\delta}}{\partial \alpha_c} + \frac{\partial \dot{\psi}}{\partial \alpha_c} \right) = \frac{\partial Y_1}{\partial \alpha_c} + \frac{\partial Y_2}{\partial \alpha_c}$$

By introducing the gain in yaw velocity into the above equation, one obtains:

$$MV \left( \frac{\partial \dot{\delta}}{\partial \alpha_c} + \frac{l_1 Y_{Fr} - l_2 Y_{Rear}}{I_z \dot{\alpha}_c} \right) = \frac{\partial Y_1}{\partial \alpha_c} + \frac{\partial Y_2}{\partial \alpha_c}$$

$$\frac{\partial \dot{\delta}}{\partial \alpha_c} = \frac{\frac{\partial Y_1}{\partial \alpha_c} + \frac{\partial Y_2}{\partial \alpha_c} - MV\frac{l_1 Y_1 - l_2 Y_2}{I_z \dot{\alpha}_c}}{MV}$$

$$\frac{\partial \dot{\delta}}{\partial \alpha_c} = \frac{\frac{\partial Y_1}{\partial t} + \frac{\partial Y_2}{\partial t} - MV\frac{l_1 Y_1 - l_2 Y_2}{I_z}}{MV\dot{\alpha}_c}$$

$$\frac{\partial \dot{\delta}}{\partial \alpha_c} = \frac{1}{MV\dot{\alpha}_c}\left(\frac{\partial Y_1}{\partial t} + \frac{\partial Y_2}{\partial t}\right) - \frac{l_1 Y_1 - l_2 Y_2}{I_z \dot{\alpha}_c},$$

i.e. the expression for the gain in sideslip velocity.

By adding the two gains one arrives at the gain in lateral acceleration with respect to variation of the steering of the wheels:

$$\frac{\partial \gamma_t}{\partial \alpha_c} = \frac{1}{M\dot{\alpha}_c}\left(\frac{\partial Y_1}{\partial t} + \frac{\partial Y_2}{\partial t}\right)$$

In order to make a connection with the "subjective" perception of the driver, we reformulate, as above, the gains at the steering wheel ($\alpha_v$ being the angle of the steering wheel) by introducing the reduction ratio of the steering command: $\alpha_v = \alpha_c \times n$. The gain in lateral acceleration becomes:

$$\frac{\partial \gamma_t}{\partial \alpha_v} = \frac{1}{nM\dot{\alpha}_v}\left(\frac{\partial Y_1}{\partial t} + \frac{\partial Y_2}{\partial t}\right) \quad (19)$$

It is proposed that a trajectory control system be actuated as soon as the gain in the lateral acceleration as a function of the angle at the steering wheel (see equation (19)) becomes too small (understeering) or too large (oversteering). The stability criterion thus proposed expresses the fact that the vehicle remains stable as long as the gain remains limited.

Of course, a gain in lateral acceleration could also be expressed, which would be a different expression of the same physical phenomenon as the gain in yaw velocity. A comparable criterion could be constructed in an equivalent manner starting from the gain in sideslip velocity.

A simulation of the dynamic handling of a vehicle under typical maneuvers is presented with the aid of the following figures. The simulation model that is used is a four-wheeled vehicle model with 7 degrees of freedom enabling the equilibrium of the vehicle to be expressed in terms of yaw, pitch, roll, and rotation of the four wheels. The three simulations presented here relate to a vehicle whose characteristics are those of a Golf car travelling at a speed of 90 kph.

In the first simulation (FIGS. 3a, 3b and 3c), a sinusoidal impulse of frequency 0.5 Hz, of increasing amplitude and on a dry surface, is plotted as steering wheel expectation.

Figure 4:
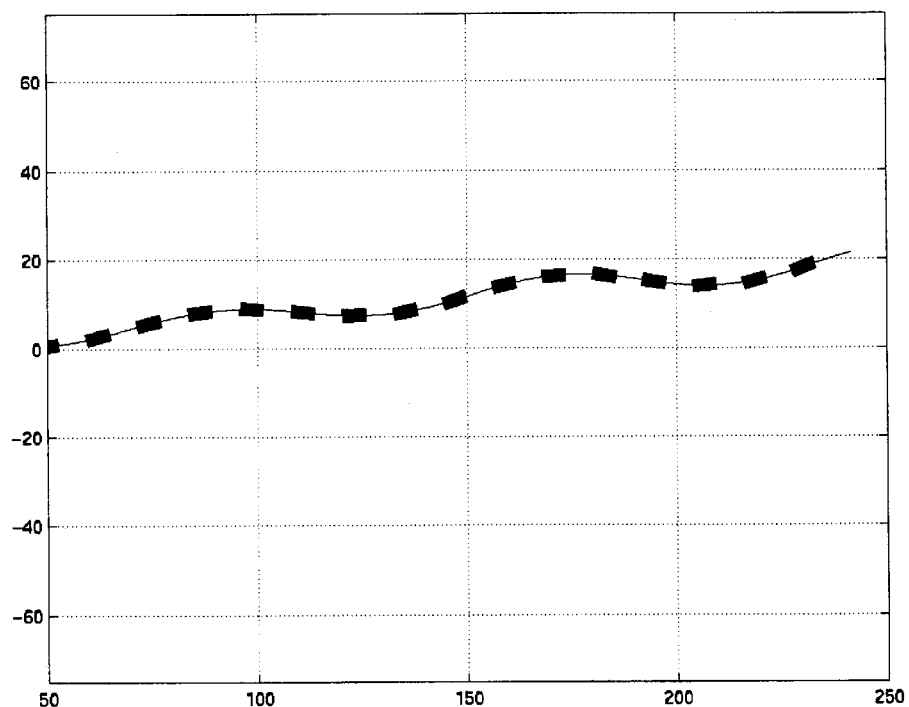
FIG. 4 illustrates the trajectory of the vehicle in the case illustrated in FIGS. 3a, 3b and 3c, FIGS. 5a, 5b and 5c illustrate the lateral forces and yaw moments resulting from an increasing zigzag steering maneuver, on a wet surface, at 90 km/hour.

In all the figures illustrating lateral forces (Y) or yaw moments (Mz), the continuous curves denoted by "r" represent the real values, while the dotted curves, denoted by "s", represent the values desired by the driver. The plotted curves show the difference between the sum of the two lateral forces of a wheel axle (front axle or rear axle according to the indices "1" or "2" in the figures) and the force desired by the driver, in the context of the formulae (12) (13) and (14). The saturation of the forces of the pneumatic tire with regard to the expectations of the driver and the phase shift between the real forces and the expected forces may be recorded. FIG. 4 symbolizes the vehicle (depicted as a rectangle) on the trajectory described by its center of gravity (denoted by a continuous curve). The phase shift between the actual handling of the vehicle and the desired trajectory may be observed by recording, in some of the successive positions illustrated in FIG. 4, the more or less large angle between the orientation of the vehicle and the tangent to the trajectory at the center of gravity of the vehicle.

Figure 6:
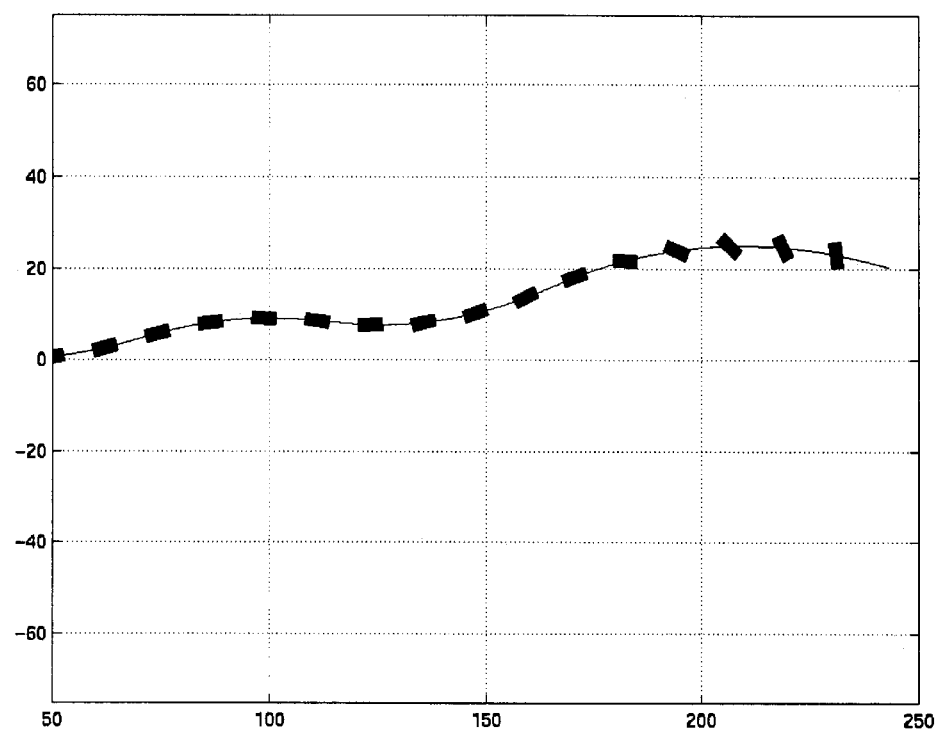
FIG. 6 illustrates the trajectory of the vehicle in the case illustrated in FIGS. 5a, 5b and 5c, FIGS. 7a, 7b and 7c illustrate the lateral forces and yaw moments resulting from a steering maneuver in order to avoid an obstacle, on a wet surface, at 90 km/hour.
Figure 7:
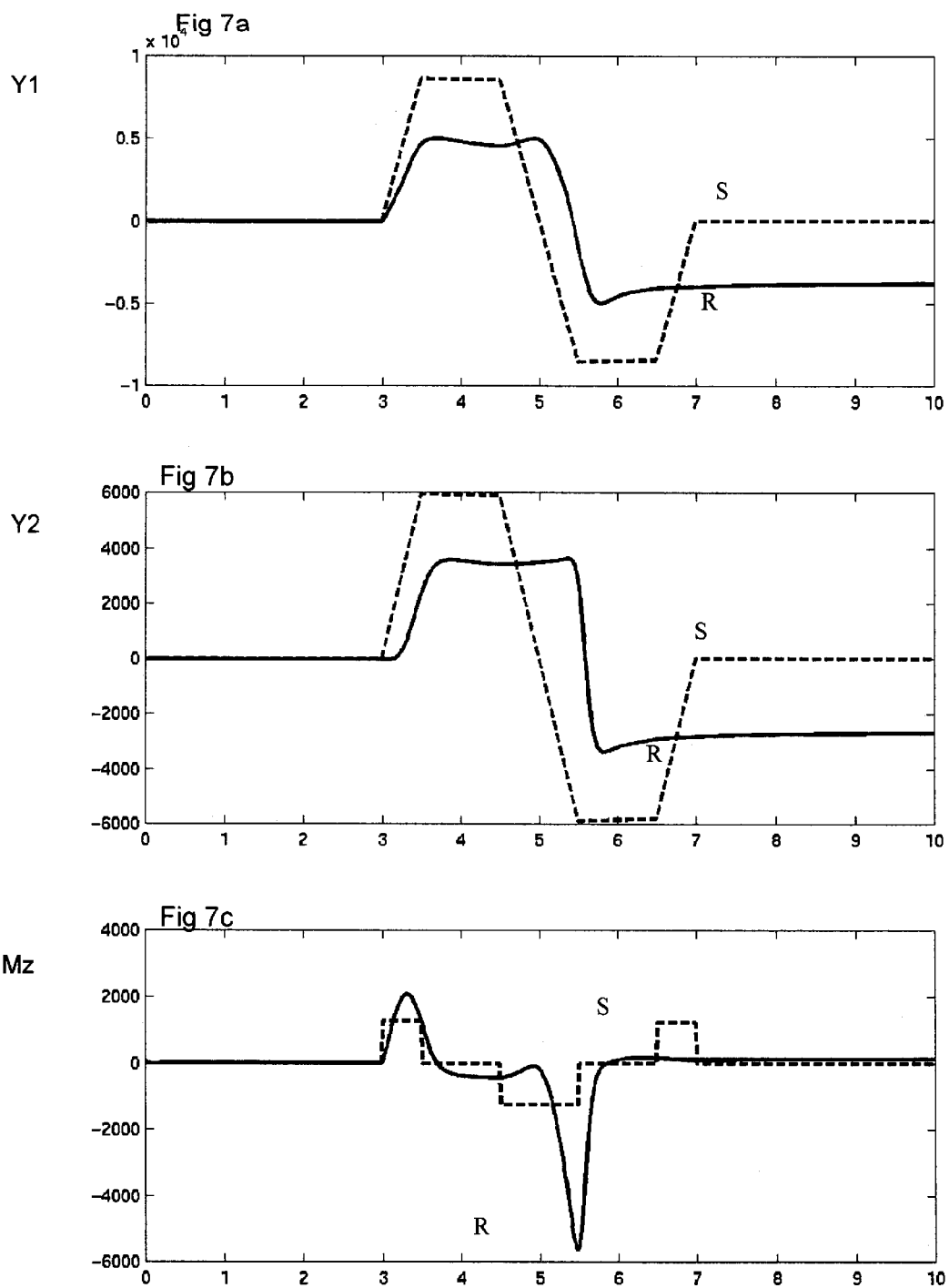
Figure 8:
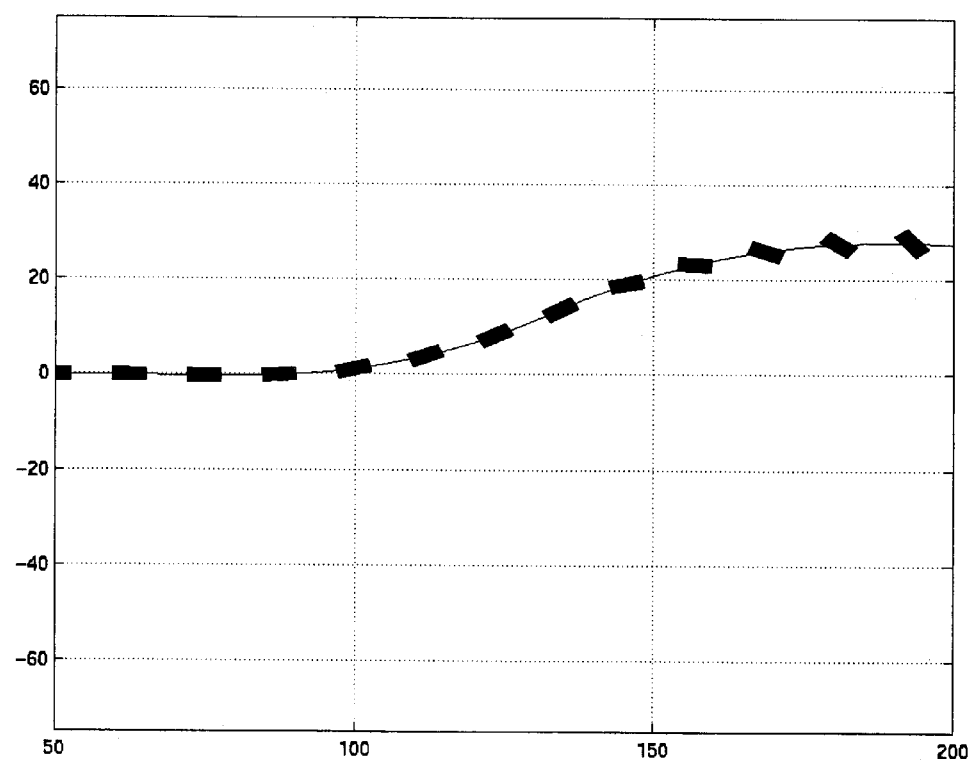
FIG. 8 illustrates the trajectory of the vehicle in the case illustrated in FIGS. 7a, 7b and 7c, FIGS. 9a, 9b and 9c illustrate the lateral forces and yaw moments resulting from a steering maneuver in order to avoid an obstacle, on a wet surface, at 90 km/hour, for a vehicle equipped with a dynamic control arrangement of the roll moment distribution.
Figure 10:
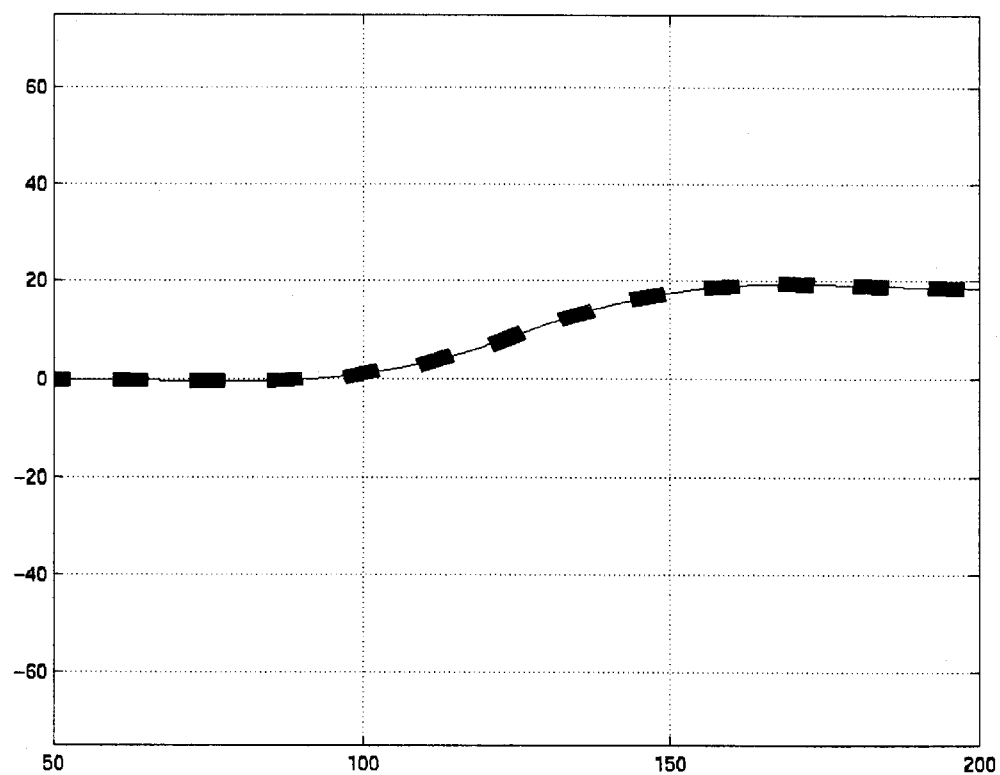
FIG. 10 illustrates the trajectory of the vehicle in the case illustrated in FIGS. 9a, 9b and 9c.
Figure 11:
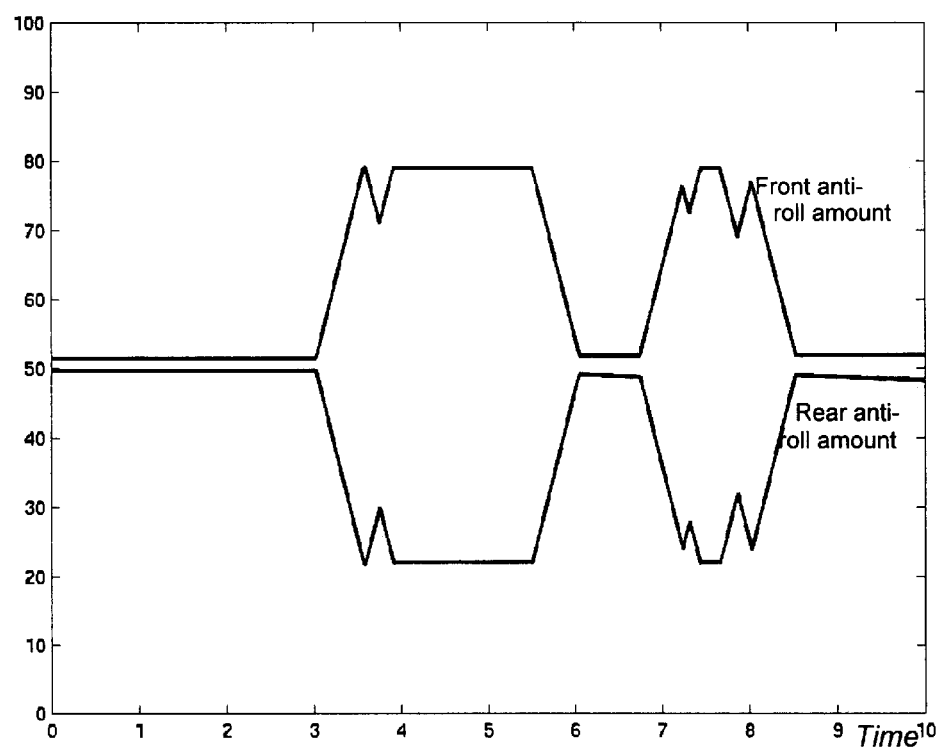
FIG. 11 illustrates the evolution of the roll moment distribution for stabilizing the vehicle.

In the second simulation (FIGS. 5a, 5b and 5c), a sinusoidal impulse of frequency 0.5 Hz, of increasing amplitude and on a wet surface, is plotted as steering wheel expectation until loss of control of the vehicle due to oversteering. This loss of control may be anticipated in the difference between the desired yaw moment and the actual yaw moment. The actual yaw moment is much too large and causes the vehicle to swerve, as can be seen on the trajectory (FIG. 6).

In the third simulation (FIGS. 7a, 7b, 7c and 8), the driver changes lane on a wet surface and loses control of the vehicle. This dangerous situation may thus be detected by noting the difference between the yaw moments and desired forces and the actual forces experienced by the vehicle.

In the fourth simulation (FIGS. 9a, 9b, 9c, 10 and 11), it is shown how changing the roll moment distribution between the front and rear, controlled as explained above, enables the trajectory of the vehicle to be stabilized. The maneuver is identical to the previous one (avoiding an obstacle on a wet surface at 90 km/hour). As soon as excessive real yaw forces are detected, the roll moment is reinforced at the front of the vehicle and reduced by the same amount at the rear of the vehicle so as to stabilize the vehicle as quickly as possible and to best utilize the gripping potential of the four tires. The saturation of the forces is better controlled, which permits smaller phase shifts, and accordingly yaw moments are handled better and adverse vehicle body responses are identified more readily.

I claim:

1. A method for controlling the stability of a vehicle, said vehicle comprising a body and at least one front suspension device and at least one rear suspension device, each suspension device comprising at least one wheel, said vehicle being provided with operating means in order to act on the forces transmitted to the ground by each of the wheels, comprising the following steps:
   (a) determining in real time the actual lateral forces "Y" acting at the center of each of the front and rear wheels;
   (b) determining the desired value of at least one reference parameter, said at least one reference parameter being correlatable to the actual lateral forces "Y" acting at the center of each of the front and rear wheels;
   (c) comparing said desired value of the reference parameter of step (b) to the actual lateral forces "Y" to determine whether the actual lateral forces "Y" are compatible with the desired value of the reference parameter; and
   (d) if the comparison of step (c) indicates that the actual lateral forces "Y" acting on at least one of the front and rear wheels are not compatible with the desired value of the reference parameter, controlling the operating means such that the actual lateral forces "Y" are brought into substantial compatibility with the desired value of the reference parameter.

2. A method according to claim 1, wherein:
   said desired value of said at least one reference parameter of step (b) is the desired lateral forces "$Y_{desired}$" and the desired lateral forces "Y" desired are determined in real time as a result of driver control of the operating means.

3. A method according to claim 2, wherein:
step (c) further comprises generating an error signal representative of the magnitude and direction of the difference between the actual lateral forces "Y" and the desired lateral forces "$Y_{desired}$" for said at least one wheel; and
step (d) comprises controlling said operating means to minimize said error signal.

4. A method according to claim 1, wherein:
step (a) comprises determining in real time a gain in the yaw velocity with respect to the steering wheel velocity;
said desired value of said at least one reference parameter of step (b) is a predetermined desired gain in the yaw velocity; and
step (c) comprises determining a low threshold value of the desired yaw velocity gain and a high threshold value of the desired yaw velocity gain, and comparing said gain determined in step (a) with at least one of said low threshold value and said high threshold value.

5. A method according to claim 4, wherein step (d) comprises:
if the yaw velocity gain determined in step (a) is less than said low threshold, controlling the operating means in order to increase the steering of the vehicle, and if the yaw velocity gain determined in step (a) is greater than said high threshold, controlling the operating means in order to reduce the steering of the vehicle.

6. A method according to claim 5, in which the low threshold is 0.1 and the high threshold is 0.5.

7. A method according to claim 4, wherein the step (a) comprises the steps of
measuring in real time the angle at the steering wheel; and
calculating in real time the yaw moment from the lateral forces "Y" and the distances of the center of gravity of the vehicle from the front and rear wheels.

8. A method for controlling the stability of a vehicle, said vehicle comprising a body and at least one front suspension device and at least one rear suspension device, each suspension device comprising at least one wheel, said vehicle being provided with operating means in order to act on the forces transmitted to the ground by each of the wheels, comprising the following steps:
(a) determining in real time the actual lateral forces "Y" acting at the center of each of the front and rear wheels and calculating in real time the effective yaw moment corresponding to the actual lateral forces "Y";
(b) determining in real time the value of a desired yaw moment "M desired" as a result of driver control of the operating means, said desired yaw moment parameter being correlatable to the actual lateral forces "Y" acting at the center of each of the front and rear wheels;
(c) comparing said value of the desired yaw moment "M desired" determined in step (b) to the effective yaw moment of step (a) to determine whether the actual lateral forces "Y" are compatible with the desired value of the reference parameter; and
(d) if the comparison of step (c) indicates that the actual lateral forces "Y" acting on at least one of the front and rear wheels are not compatible with the value of the desired yaw moment "$M_{desired}$," controlling the operating means such that the actual lateral forces "Y" are brought into substantial compatibility with the value of the desired yaw moment "$M_{desired}$".

9. A method according to claim 8, wherein:
step (c) further comprises generating an error signal representative of the magnitude and the direction of the difference between the effective yaw moment and the desired yaw moment "$M_{desired}$" for said at least one wheel; and step (d) comprises controlling said operating means to minimize said error signal.

10. A method according to claim 9, wherein the vehicle includes a front axle with a front suspension device at either end thereof and a rear axle with a rear suspension device at either end thereof, and wherein step (d) comprises a dynamic roll moment distribution between the front axle and the rear axle to preserve a constant anti-roll effect, the rear roll moment being reduced in order to decrease the yaw moment exerted by the wheels on the vehicle, and conversely, so as to reduce the error signal.

11. A method according to claim 9, wherein the vehicle includes a supplementary means for steering said at least one front wheel, said supplementary means acting independently of the steering control device, and wherein step (d) comprises a dynamic command of said supplementary steering means intended to alter the yaw moment exerted on the vehicle by the wheels, in order to reduce the error signal.

12. A method according to claim 9, wherein said vehicle comprises means for applying a braking torque selectively to each of the wheels, and wherein step (d) comprises exerting a braking force on at least one of the wheels on the outside of a turn negotiated by the vehicle in order to reduce the yaw moment exerted by the wheels on the vehicle, or exerting a braking force on at least one of the wheels on the inside of a turn negotiated by the vehicle in order to increase the yaw moment exerted by the wheels on the vehicle, so as to reduce the error signal.

13. A method according to claim 8, wherein step (c) comprises measuring in real time a signal at the device for controlling the steering, and utilizing said signal measurement to calculate the desired yaw moment "$M_{desired}$."

* * * * *

UNITED STATES PATENT AND TRADEMARK OFFICE
CERTIFICATE OF CORRECTION

PATENT NO. : 6,604,036 B2
DATED : August 5, 2003
INVENTOR(S) : Pallot, Patrick

It is certified that error appears in the above-identified patent and that said Letters Patent is hereby corrected as shown below:

Title page,
Item [57], ABSTRACT,
Line 3, "Since," should read -- Since --
After *Primary Examiner*— Tan Q. Nguyen, insert on the next line
-- [74] *Attorney, Agent, or Firm*—Baker Botts L.L.P. --

Column 7,
Line 25, "is the" (second occurrence) should be deleted
Line 26, "distance" should be deleted
Line 36, "axle)" should read -- axle). --

Column 12,
Line 65, " "Y" desired " should read -- "Y $_{desired}$" --

Column 13,
Line 51, " "M desired" " should read -- "M $_{desired}$" --

Column 14,
Lines 3–4, " "M desired" " should read -- "M $_{desired}$" --
Line 19, "step (d)" should read -- ¶step (d) --

Signed and Sealed this

Thirteenth Day of January, 2004

JON W. DUDAS
*Acting Director of the United States Patent and Trademark Office*